July 18, 1944.   A. J. GRUNTORAD   2,353,891
ADJUSTABLE WORK-HOLDING DEVICE
Filed March 19, 1943   5 Sheets-Sheet 1
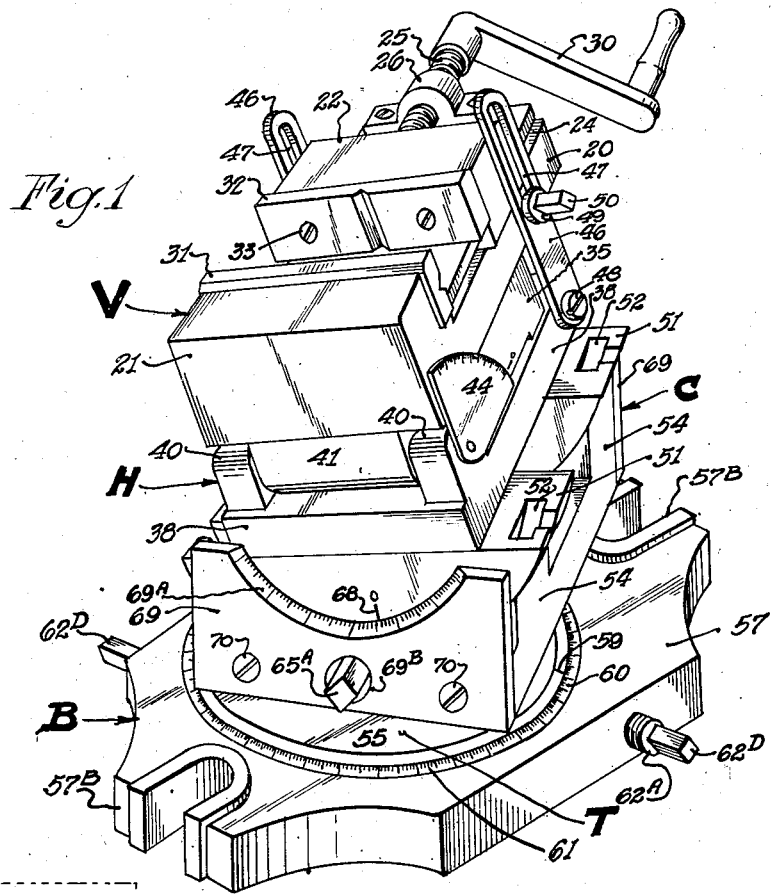
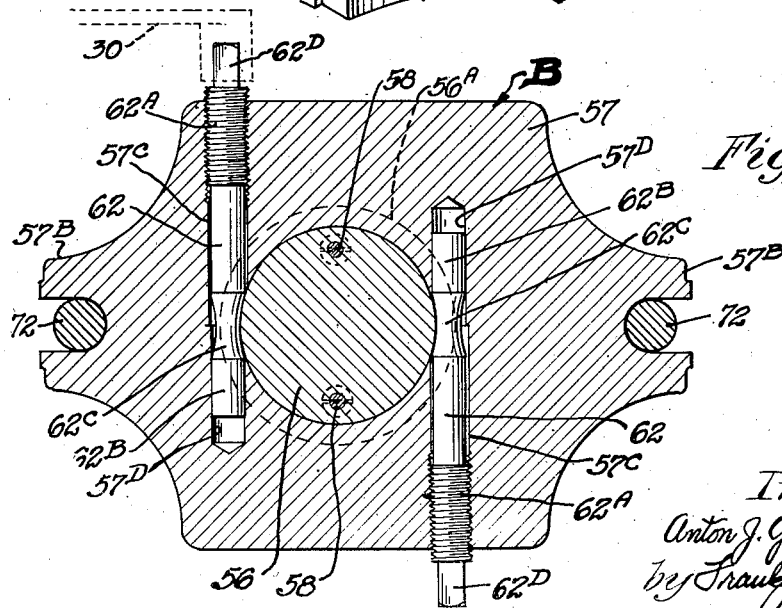
Inventor
Anton J. Gruntorad
by Frank Schraeder Jr.
Attorney.

July 18, 1944. A. J. GRUNTORAD 2,353,891
ADJUSTABLE WORK-HOLDING DEVICE
Filed March 19, 1943 5 Sheets-Sheet 2
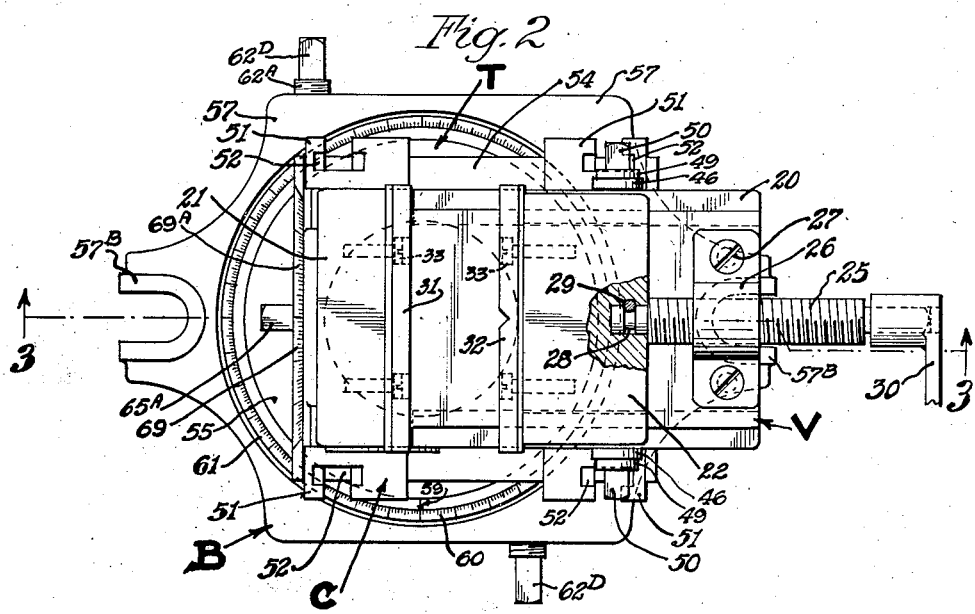
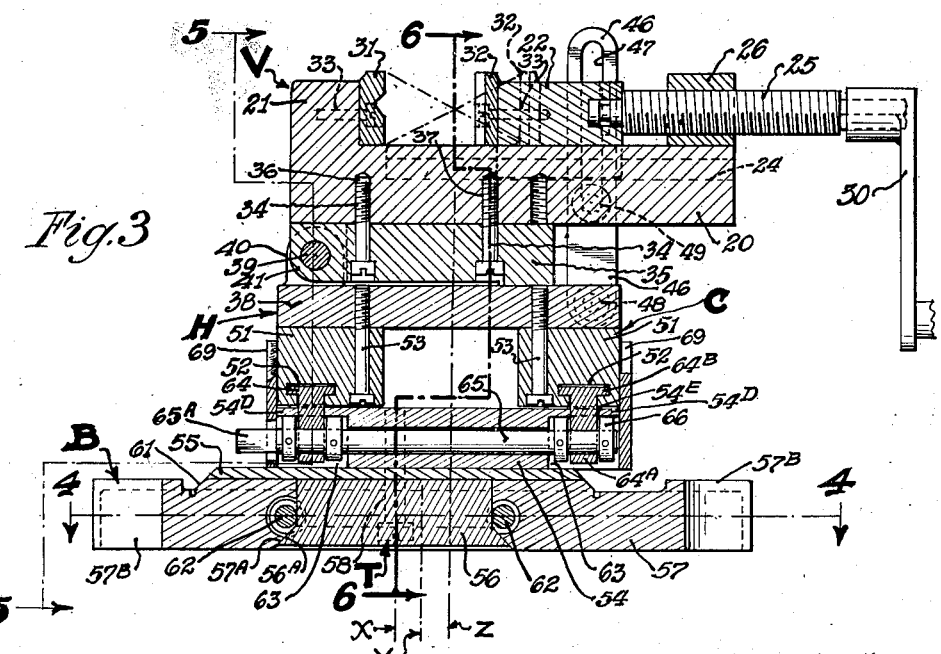
Inventor
Anton J. Gruntorad
by Frank Schraeder Jr
Attorney.

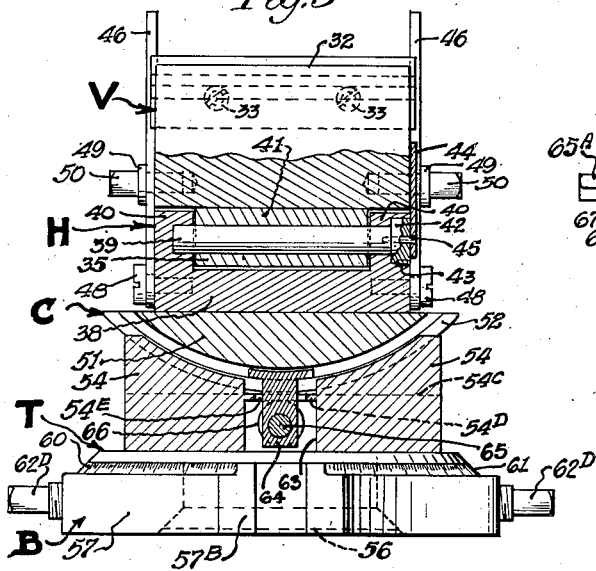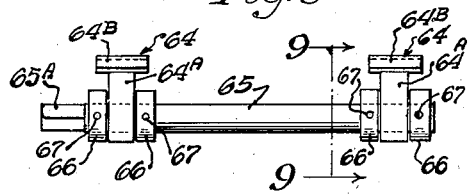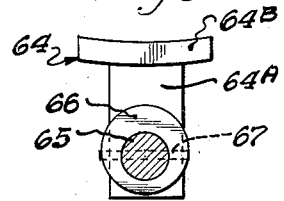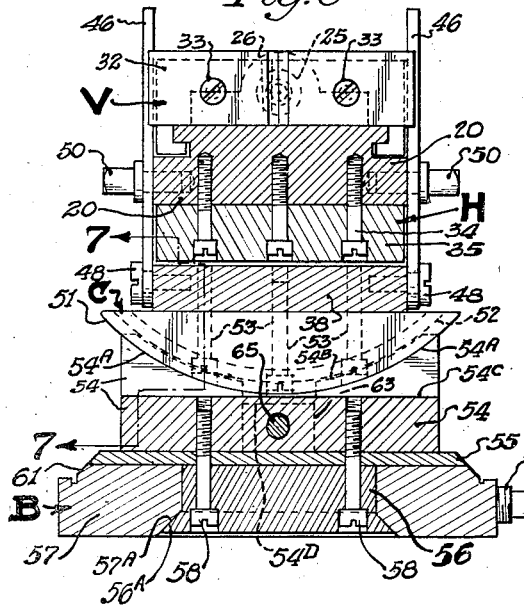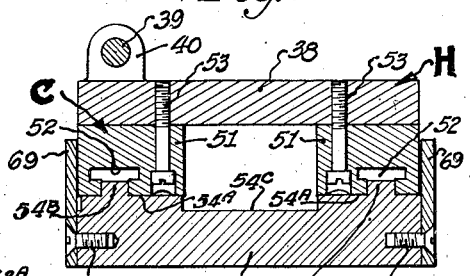

July 18, 1944.  A. J. GRUNTORAD  2,353,891
ADJUSTABLE WORK-HOLDING DEVICE
Filed March 19, 1943   5 Sheets-Sheet 4
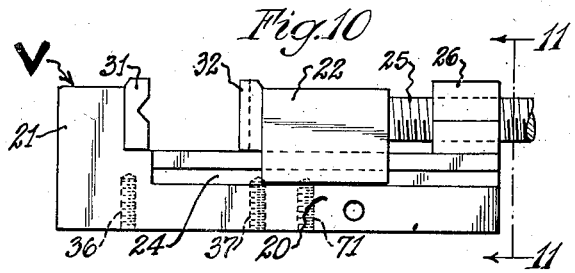
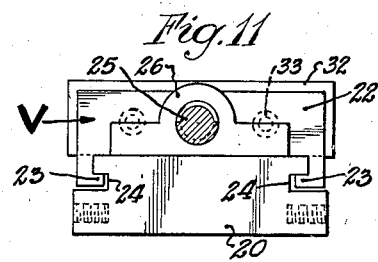
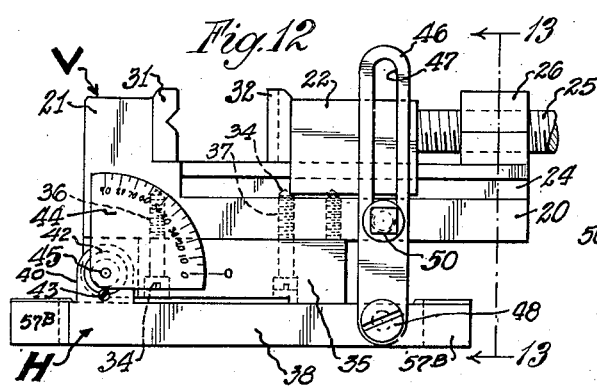
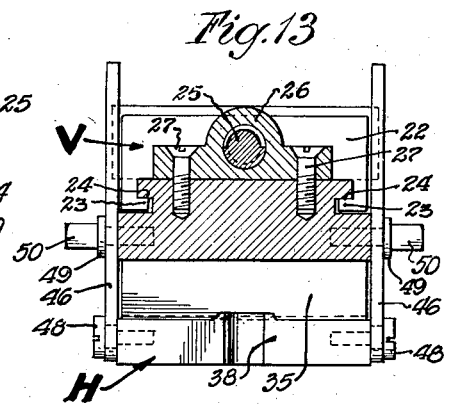
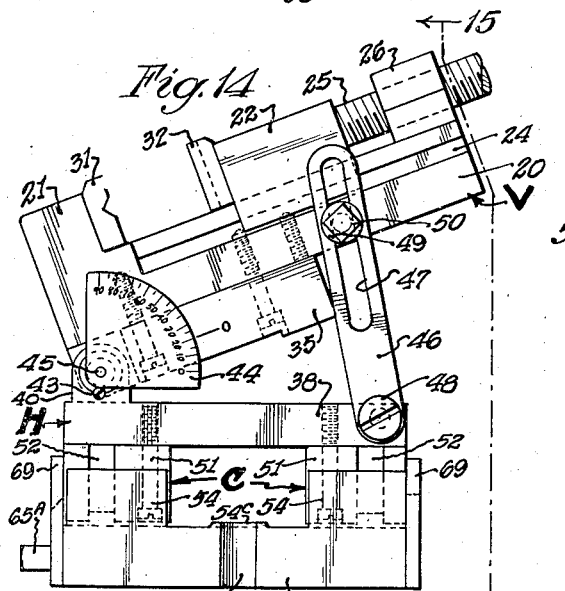
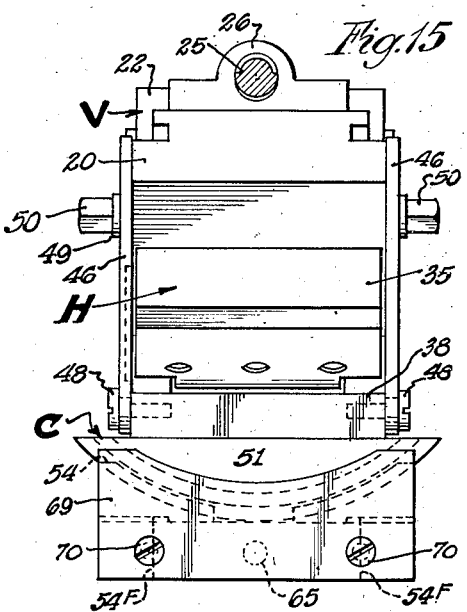
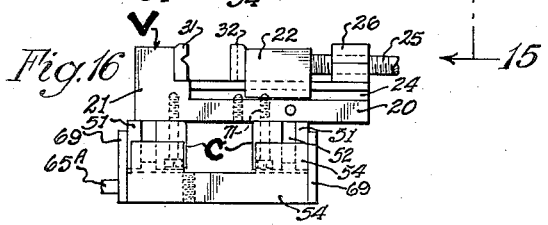
Inventor
Anton J. Gruntorad
by Frank J. Schraeder Jr.
Attorney.

July 18, 1944.  A. J. GRUNTORAD  2,353,891
ADJUSTABLE WORK-HOLDING DEVICE
Filed March 19, 1943  5 Sheets-Sheet 5
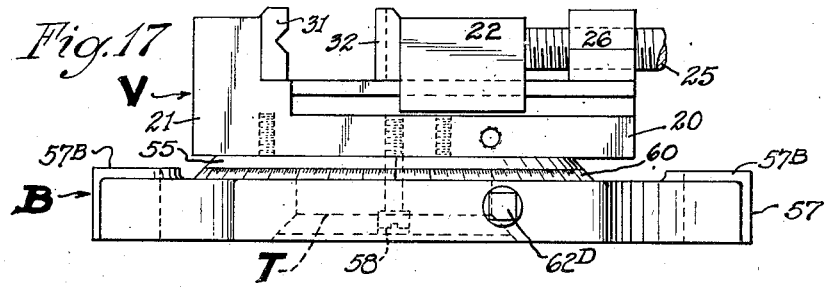
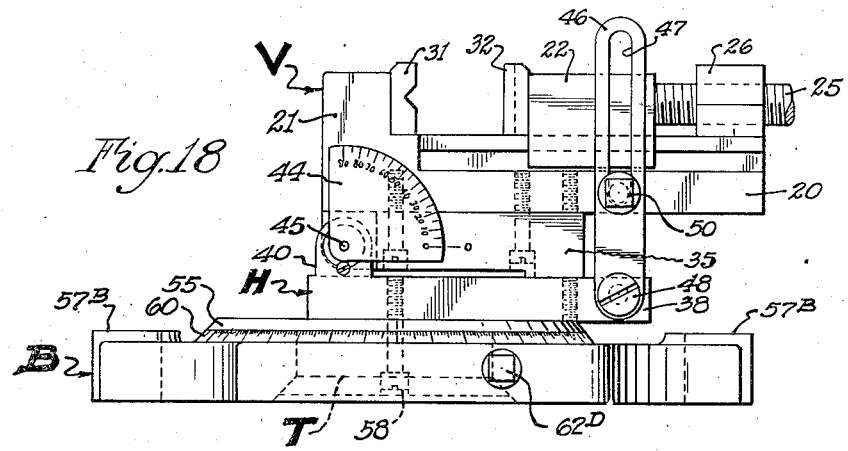
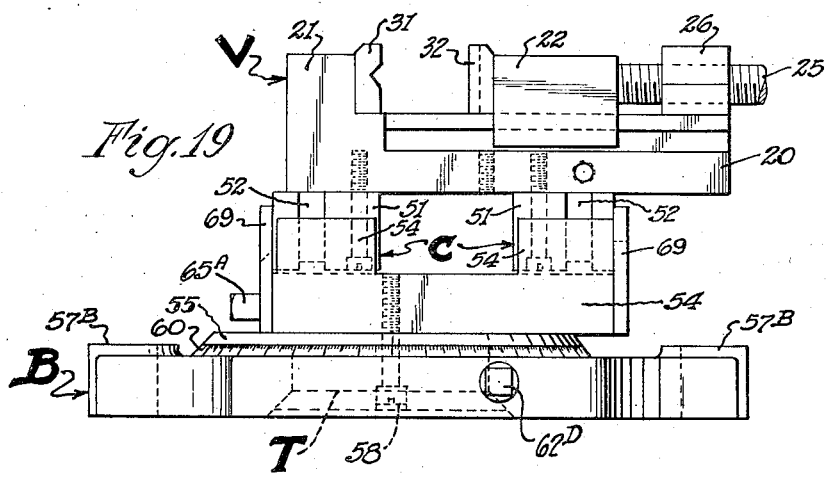
Inventor
Anton J. Gruntorad
by Frank Schraeder Jr
Attorney.

Patented July 18, 1944

2,353,891

UNITED STATES PATENT OFFICE 2,353,891

ADJUSTABLE WORK-HOLDING DEVICE

Anton J. Gruntorad, Cicero, Ill.

Application March 19, 1943, Serial No. 479,817

12 Claims. (Cl. 90—59)

This invention relates generally to adjustable work-holding devices and has particular reference to adjustable tool or work-holding vises for use on or in connection with machine tools or work benches.

Some of its uses are found in operations involving single or compound angles, such as milling tool blanks for carbide inserts, various grinding operations, such as grinding complex toolbit shapes, and in various angular operations such as drilling, boring, reaming and die sinking.

One of the objects of my invention is found in the provision of an adjustable tool or work-holding device wherein the clamp or vise is tiltable about an axis disposed transversely to the longitudinal center-line of the vise or screw which operates the movable vise jaw, and wherein the vise is rockable about an axis which is parallel to the longitudinal center-line of the jaw-operating screw, and wherein the vise is bodily rotatable on a turntable in the base of the device about a vertical axis which is perpendicular to the base. In other words, the work or tool secured between the jaws of the vise may be positioned simultaneously in three relatively different angular positions.

Another object of my invention resides in constructing and arranging the various unit elements in such manner that they may be readily disassembled and thereafter recombined in various other combinations for desired uses or purposes. For example, the vise element may be used independently of the other unit elements as a simple jaw vise. Then again, the vise element may be combined with the hinge element and used as a tiltable vise. Then again, if the combined tiltable vise is mounted on the cradle element it may be used as vise which is adapted to be tilted to various selected angles in one plane or tilted into two intersecting planes each at a selected angle. In another instance of use, the simple jaw vise may be combined with the cradle element to afford tilting or rocking of the vise about an axis which is parallel to the longitudinal axis of the screw which moves the movable jaw, in other words, this last combination does not include the hinge element.

Still another feature of my invention resides in the provision of three pairs of frictional locks for retaining the angularly adjustable elements in their desired angular positions. These locks may be briefly described as the slotted arm and screw locks for retaining the vise in tilted position; the cam locks for retaining the cradle element in adjusted angular position; and the friction pin locks for locking the turntable in its adjusted position.

Other novel features and objects of my invention will become readily apparent from the perusal of the attached drawings which illustrate a preferred embodiment of my invention which is described in the following specifications and particularly pointed out in the appended claims.

In the drawings:

Fig. 1 is a perspective view of an adjustable tool or work-holding device embodying my invention and showing the vise rotated into two relatively differently adjusted positions, that is, the vise, as illustrated in this view, is rotated horizontally about its vertical axis and also tilted on its cradle element.

Fig. 2 is a plan view of the device;

Fig. 3 is a longitudinal vertical section taken on line 3—3 of Fig. 2;

Fig. 4 is a cross-section through the base taken on line 4—4 of Fig. 3;

Figs. 5 and 6 are vertical sections taken respectively on lines 5—5 and 6—6 of Fig. 3;

Fig. 7 is a vertical section taken on line 7—7 of Fig. 6;

Fig. 8 is a side view of one of the two cam locks for the cradle element;

Fig. 9 is a cross-section taken on line 9—9 of Fig. 8 showing one of the frictional cam locks; and Figs. 10 to 15 illustrate three different combinations of the elements of my device wherein:

Fig. 10 is a side view of the vise element which can be used as a simple vise independently of the other elements of the device;

Fig. 11 is an end vertical section taken on line 11—11 of Fig. 10;

Fig. 12 is a side elevation of the vise element combined for use with the hinge element as a simple tiltable vise;

Fig. 13 is an end vertical section taken on line 13—13 of Fig. 12;

Fig. 14 is a side elevation of the vise element combined with the hinge element and the cradle element whereby the vise element is simultaneously tiltable into two intersecting planes of varying angularities, the tilting in one plane being performed independently of the tilting in the other plane;

Fig. 15 is an end elevation of the combination shown in Fig. 14;

Fig. 16 is a side view of the vise element combined with the cradle element;

Fig. 17 is a side view of the vise element combined with the turntable and base elements;

Fig. 18 is a side view of the vise element combined with the hinge, turntable and base elements; and Fig. 19 is a side view of the vise element combined with the cradle, turntable, and base elements.

Generally stated, the device consists of several unit elements which may be desired as the base element B, the turntable element T, the cradle element C, the hinge element H, and the vise element V.

The vise element V consists of a base 20 which is provided, at its front end, with an upstanding integral fixed or stationary jaw 21. A movable jaw 22 having inwardly disposed integral side guide portions 23 is slidably mounted on the base 20 with the guide portions 23 slidably positioned in the extended side grooves 24 of the base 20.

The jaw 22 is movable toward and from the stationary jaw 21 by a screw 25 which is threaded in a supporting bearing 26 secured by screws 27 to the base 20. The inner end of the screw 25 is of decreased diameter, extends into the rear end of the movable jaw 22 and is grooved as at 28 for a retaining pin 29. A socket handle 30 operates the screw 25.

The jaws 21 and 22 are provided with interchangeable hardened steel jaw plates 31 and 32 which are removably secured to the vise jaws by countersunk screws 33.

The complete vise element V is secured by screws 34 to the upper leaf or plate 35 of the hinge element H. As clearly shown in Figs. 3 and 6, the screws 34 extend upwardly through openings in the leaf 35 into threaded holes 36 and 37 in the vise base 20.

The hinge element H consists of a pair of leaves or plates 35 and 38 hingedly connected together by a pin 39 which extends through the spaced perforated ears 40, formed integrally with the leaf 38, and the perforated lug 41 which is formed integrally with the leaf 35.

The ears 40 and lug 41 of the hinge leaves are disposed at the forward end of the vise element V so that the vise element is tiltable into desired angular positions about the pin 39 and thus the vise element V is tiltable in a vertical plane about an axis which is transversely disposed to such vertical plane. As indicated in Figs. 3 and 6, the vise element V is secured to the hinge element H by two sets of screws 34, each set consisting of three of such screws 34.

The pivot pin 39 is preferably provided with an enlarged head 42 which is countersunk in one of the ears 40 and retained against rotation by a small screw 43 having half contact with the peripheral portion of the head 42.

A quadrant plate 44 graduated in degrees and minutes is secured by pin 45 to the exposed face of the head 42 of the pivot pin 39 to indicate the angle of tilt of the vise element V.

It will be noted from Fig. 5 that I prefer to shorten the pin 39 and support its inner end within one of the ears 40 in a perforation which does not extend through the ear. Obviously, the pin 39 could extend through such ear.

The frictional means for locking or retaining the vise element V in an angularly adjusted position consists of a pair of elongated arms 46 each provided with an elongated slot 47 in their upper end portions. The arms 46 are pivotally connected to the sides of the lower leaf 38 of the hinge element H by means of stud screws 48. Extending through the slots 47 into adjustably threaded connection with the base 20 of the vise element V is a pair of stud screws 49 which when tightened frictionally interlock the vise V with the arms 46 and thus retain the vise in either horizontal or tilted position. Each stud screw 49 is provided with an outwardly extending shank 50 similar in cross-section to the outer end of the vise screw 25 to adopt same for tightening engagement by the socket handle 30.

The cradle element C consists of a pair of longitudinally spaced segmental slidably supported rockers 51 each provided with an arcuate slot 52 of T-shape cross-section milled into the arcuate side thereof. Each rocker 51 is secured to the bottom face of the lower leaf 38 of the hinge element H with two sets of screws 53 countersunk into the arcuate faces thereof, each set consisting of three such screws.

Both of the rockers 51 are slidably rockably supported upon the arcuate faces 54A of a guide base member 54.

Each arcuate face 54A is formed with an upstanding integral arcuate guide rib 54B having vertical sides closely interfitting within the stem portion of the T-slot 52 to thereby guide the vise elements, which are carried on the rockers 51, during their movement into tilted position about an axis which is parallel to the longitudinal axis of the vise element V and its screw 25 when the vise is in horizontal position, and the center of which axis is the center of the radii of the arcuate faces of the rockers 51. The axis of the rockers 51 is vertically plane-aligned with the longitudinal axis of the vise element.

The guide base member 54 is mounted upon a circular style plate 55 which is supported on a turntable 56 rotatably mounted in the foundation base 57.

The turntable 56 is provided with an enlarged or flared bottom portion 56A which is countersunk in the beveled circular portion 57A of the foundation base 57. Two screws 58, countersunk in the bottom portion 56A, extend upwardly through the turntable 56 and through the style plate 55 into threaded connection with the base member 54 so that the vise elements 54, 55, and 56 are rotatable into adjusted position as a unit within the foundation base 57.

The style plate 55 is provided with a pointer or index 59 cut or engraved into the beveled edge of the style plate 55 which, in cooperation with the scale 60 showing degrees and minutes, provides means for reading the angle of rotation of the vise about the vertical axis thereof.

Figs. 3, 5 and 6 show the scale 60 on the circular dial portion 61 cut into the upper face of the base 57 adjacent the margin of the style plate 55.

As more clearly evident from Figs. 2, 3 and 4, and particularly in Fig. 3, I have intentionally offset the vise element V longitudinally of the base 57 to the right of the vertical axis of the turntable T and slightly to the right of the center of the base 57. In other words, referring particularly to Fig. 3, the vertical center-line or vertical axis X of the turntable 56 is offset to the left of the center-line Y which is the vertical center-line of the base 57, and the vertical center-line Z which passes through the center of the opening between the vise jaws 31 and 32, when they are in maximum open position, is offset to the right of the vertical center-line Y of the base 57. This offset arrangement provides advantages in structural design tending toward stabilizing the device by locating the center of the work or tool held between the vise jaws in closer proximity to the vertical center-line of the turntable 56. This offset arrangement results in locating the pivotal axis of the vise (about pin 39) closer to the vertical axis X of the turntable so that the resultant forces passing through the pivot pin 39 and the arms 46 are more equally distributed over the rocker base 54 and its supporting turntable 56 and foundation base 57.

The foundation base 57 is provided with a pair of longitudinally aligned open-slotted lugs 57B through which bolts may be passed to secure the device to a machine tool bed or bench.

The rocker base member 54 is made with a pair of longitudinally aligned openings 63 open at their ends and bottoms but such openings extend upwardly to a spaced distance from the top face 54C of the base member 54 to provide a horizontal wall portion 54D.

The tiltable rockers 51 are arranged to be frictionally locked into adjusted tilted or horizontal positions by means of two lock bolts 64 of general T-shape. Each lock bolt 64 consists of a vertical stem 64A and an integral transverse top head 64B of slightly arcuate form.

The lock bolts 64 are loosely mounted on a locking shaft 65 and are positioned within the openings 63 with their stems 64A depending through openings 54E cut through the horizontal wall 54D and their arcuate heads 64B positioned in the T-slot 52.

Each lock bolt 64 is provided with a pair of cams 66, one mounted on each side of the stem 64A and rigidly fixed to the shaft 65, as by transverse pins 67.

The locking shaft 65 is provided with a square head 65A which extends forwardly of the device and is adapted to be engaged by the socket handle 30 for locking rotation thereby.

The angular tilt of the vise about the axis of the rockers 51 is ascertainable by the index 68 which is registrable with a suitable scale of degrees and minutes on the curved beveled edge 69A of the dial plate 69 which is secured by screws 70 to the front face of the base member 54. A similar plate 69 is preferably similarly secured to the rear face of the base member 54 to close the opening 63 at the rear end.

As shown in Figs. 3 and 6, the locking shaft 65 is supported within an opening which extends longitudinally through the base member 54 and this opening is made throughout its length slightly over in cross-section vertically or perpendicularly to the base bottom to permit the shaft 65 to move slightly up and down during its locking and unlocking rotary movements.

The locking shaft head 65A extends through an opening 69B in the front plate 69. The engagement and partial rotation of the head 65A by the socket handle 30 will cause a rotation of the four cams 66 and their frictional engagement with the bottom faces of the horizontal wall 54D whereupon the locking T-bolts 64 and their supporting shaft 65 will be displaced slightly downwardly to thereby cause the lock bolt heads 64B to frictionally engage the arcuate faces of the horizontal portions of the T-slots 52 of the rockers 51 and retain same in the desired tilted position.

Frictional means for locking the turntable 56 in the desired rotated position is provided. Such locking means consists of one or more rotatable elongated pins 62. I prefer to use and show two of such pins 62 mounted within the foundation base 57 from opposite sides thereof, as shown in Fig. 4. Both of these pins 62 are of like construction and function alike and each consists of an end portion 62A screw-threaded into the outer thread end portion of an elongated opening 57C which is of uniform circular cross-section and slightly greater in diameter than the diameter of the unthreaded shank portion of the pin 62. This portion 57C extends up to the longitudinal center-line of the base 57 and, beyond the longitudinal center line of the base, the blind extension 57D being of a slightly reduced diameter to fit closely about the cylindrical inner end 62B of the pin 62.

Between the shank portions 62A and 62B, which are of like diameter, the shank portion 62C is circularly ground to provide an arcuate surface whose radius is slightly greater than the radius of the vertical peripheral face of the turntable 56. Normally, the vertical peripheral face of the turntable 56 is in loose engagement with the arcuate faces of the pin portions 62C and the turntable is free to rotate into desired positions.

When the device has been rotated on its turntable 56 into selected adjusted position it may be readily and quickly frictionally locked in such selected position by the rotation of either one, or both, of the locking pins 62 by engaging the outwardly extending head 62D within the socket handle 30 and partially rotating the handle 30 to thereby cause an inward movement of the pin 62 with its arcuate face 62C slightly displaced relatively to the turntable peripheral vertical face into frictional binding contact therewith.

As above indicated, the unit elements, such as the vise element V, the hinge element H, the cradle element C, the turntable element T, and the foundation base element B, may be assembled in various combinations to meet different work requirements.

Figs. 10 and 11 illustrate the use of the vise element V as a simple vise which can be attached to a machine tool or bench by machine bolts or screws which extend into any of the threaded openings 36, 37 and 71.

Figs. 12 and 13 show the vise element V combined for use with the hinge element H to afford use of the simple vise as a tiltable vise. The hinge base 38 may be secured to a machine tool or bench by bolts or screws which extend into the threaded openings for the screws 53, shown in Fig. 3, or the hinge base 38 could be provided with recessed end lugs 57B, as shown in Figs. 12 and 13, for bolt securement to a machine tool or bench.

Figs. 14 and 15 show the vise element V combined for use with the hinge and cradle elements. This combination may be secured to a machine tool or bench by bolts or screws which extend into the two threaded openings in the rocker guide base member 54 into which the turntable screws 58 extend, or the base member 54 could be provided at opposite ends thereof with recesses 54F for bolt or screw securement. This combination provides a vise which is tiltable in two directions on axes which are relatively transversely disposed.

Fig. 16 shows the vise element V combined with the cradle element C whereby the simple vise element V is rendered tiltable about an axis which is plane-aligned with and parallel to the longitudinal axis of the vise element.

Fig. 17 shows the vise element V combined with the turntable T and its supporting foundation base B as a rotatable vise unit.

Fig. 18 shows the vise and hinge elements, V and H, combined with the turntable T and its supporting foundation base B as a tiltable and rotatable vise unit.

Fig. 19 shows the vise and cradle elements, V and C, combined with the turntable T and its supporting foundation base B as a unit wherein the vise is rotatable about a vertical axis and also tiltable in two different angles of inclination.

The foundation base 57 may readily be secured to a machine tool or work bench in any well known manner, for example, as with bolts 72 extending through the openings in the lugs 57B.

While the hinge and cradle elements, H and C, may be secured to a machine tool or work bench by threaded connection members, such as screws or bolts, which can be inserted into the threaded openings in the lower leaf 38 and base 54, the hinge and cradle elements may be provided with other means for securing same to a machine tool or work bench and such other means of securement may consist in the provision of elongated bolt holes in the lower leaf 38 and base 54 as illustrated in Figs. 12 to 15 inclusive.

It is obvious that my improved device could be made with only one of the tiltable segmental rockers or cradles 51 but made wider than either one of the two preferably spaced cradles 51 as shown in the drawings for illustrative purposes, and such modification one or more slots 52 would be provided for cooperation with one or more of the frictional lock bolts 64.

It will be apparent that the arcuate guide rib 54B on each rocker or cradle supporting face 54A is cut in the center to provide two longitudinally aligned spaced rib portions 54B. The space between these aligned rib portions is clearly shown in Figs. 5 and 6, and is a necessary provision to provide space for the frictional locking T-bolts 64. The ribs 54B are cut on at points in vertical alignment with the vertical sides of the front and rear openings 63.

Various changes and modifications may be made in the details of the preferred construction shown in the attached drawings without departing from the spirit of my invention which is defined in the appended claims.

I claim:

1. A tool or work-holding device comprising a vise element; a hinge element below said vise element comprising a pair of superposed pivotally connected leaves, the upper one of said leaves being detachably connected to said vise element and the pivotal axis of said hinge element being disposed transversely to the longitudinal axis of said vise element; vise retaining means interconnecting said hinge element with said vise element for retaining said vise element in selectively adjusted tilted position; a cradle element below said hinge element including an adjustably tiltable cradle detachably connected to the lower one of said hinge leaves and a supporting base member for said cradle, said cradle being tiltable about a horizontal axis which is vertically plane-aligned with the longitudinal axis of said vise element; cradle securing means for securing said cradle element in selectively adjusted tilted position; a foundation base for the device; and a turntable rotatably supported on said foundation base, said turntable being rotatable about a vertical axis intersecting said horizontal axis of said cradle and being detachably connected to said cradle supporting base member; and means for securing said turntable in selected rotatably adjusted position; said cradle comprising a segmental member slidably mounted on an arcuate face of said cradle supporting base member and having an elongated slot of T-shaped cross-section in the segmental face thereof, said cradle supporting base member having a pair of longitudinally aligned spaced arcuate guide ribs extending into the stem portion of said T-shaped elongated slot, said cradle securing means comprising a T-shaped friction lock having an arcuate head-portion disposed in the head-portion of said T-shaped slot and a stem-portion depending through the stem-portion of said T-shaped slot, a shaft rotatably supported on said cradle supporting base member and extending through the stem-portion of said T-shaped lock, and a cam fixed to and rotatable with said shaft adapted to frictionally interlock said segmental member in adjusted position relatively to and with said cradle supporting base member.

2. A tool or work-holding device comprising a vise element; a hinge element below said vise element comprising a pair of superposed pivotally connected leaves, the upper one of said leaves being detachably connected to said vise element and the pivotal axis of said hinge element being disposed transversely to the longitudinal axis of said vise element; vise retaining means interconnecting said hinge element with said vise element for retaining said vise element in selectively adjusted tilted position; a cradle element below said hinge element including an adjustably tiltable cradle detachably connected to the lower one of said hinge leaves and a supporting base member for said cradle, said cradle being tiltable about a horizontal axis which is vertically plane-aligned with the longitudinal axis of said vise element; cradle securing means for securing said cradle element in selectively adjusted tilted position; a foundation base for the device; and a turntable rotatably supported on said foundation base, said turntable being rotatable about a vertical axis intersecting said horizontal axis of said cradle and being detachably connected to said cradle supporting base member; and means for securing said turntable in selected rotatably adjusted position; said cradle comprising a plurality of spaced segmental members slidably mounted on spaced arcuate faces of said cradle supporting base member, each of said segmental members having an elongated slot of T-shaped cross-section in the segmental face thereof, said cradle supporting base member having a pair of longitudinally aligned spaced arcuate guide ribs on each arcuate face thereof extending into the stem portions of said T-shaped elongated slots, and said cradle securing means comprising a plurality of T-shaped friction locks having an arcuate head-portion disposed in the head-portions of said T-shaped slots and stem-portions depending through the stem-portions of said T-shaped slots, a shaft rotatably supported on said cradle supporting base member and extending through the stem-portions of said T-shaped locks, and a plurality of cams fixed to and rotatable with said shaft adapted to frictionally interlock said segmental members in adjusted position relatively to and with said cradle supporting base member.

3. A tool or work-holding device comprising a vise element; a hinge element below said vise element comprising a pair of superposed pivotally connected leaves, the upper one of said leaves being detachably connected to said vise element and the pivotal axis of said hinge element being disposed transversely to the longitudinal axis of said vise element; vise retaining means interconnecting said hinge element with said vise element for retaining said vise element in selectively adjusted tilted position; a cradle element below said hinge element including an adjustably tiltable cradle detachably connected to the lower one of said hinge leaves and a supporting base member for said cradle, said cradle being tiltable about a horizontal axis which is vertically plane-aligned with the longitudinal axis of said vise element; cradle securing means for securing said cradle element in selectively adjusted tilted position; a foundation base for the device; and a turntable rotatably supported on said foundation base, said turntable being rotatable about vertical axis intersecting said horizontal axis of said cradle and being detachably connected to said cradle supporting base member; and means for securing said turntable in selected rotatably adjusted position; the vertical axis of said turntable being disposed forwardly of the vertical center-line of said cradle element relatively longitudinally of said foundation base.

4. A tool or working-device comprising a vise element; a hinge element below said vise element comprising a pair of superposed pivotally connected leaves, the upper one of said leaves being detachably connected to said vise element and the pivotal axis of said hinge element being disposed transversely to the longitudinal axis of said vise element; vise retaining means interconnecting said hinge element with said vise element for retaining said vise element in selectively adjusted tilted position; a cradle element below said hinge element including an adjustably tiltable cradle detachably connected to the lower one of said hinge leaves and a supporting base member for said cradle, said cradle being tiltable about a horizontal axis which is vertically plane-aligned with the longitudinal axis of said vise element; cradle securing means for securing said cradle element in selectively adjusted tilted position; a foundation base for the device; and a turntable rotatably supported on said foundation base, said turntable being rotatable about a vertical axis intersecting said horizontal axis of said cradle and being detachably connected to said cradle supporting base member; and means for securing said turntable in selected rotatably adjusted position; the center of said foundation base being disposed between the vertical axis of said turntable and the vertical center-line of said cradle element relatively longitudinally of said foundation base.

5. A tool or work-holding device comprising a vise element; a hinge element below said vise element comprising a pair of superposed pivotally connected leaves, the upper one of said leaves being detachably connected to said vise element and the pivotal axis of said hinge element being disposed transversely to the longitudinal axis of said vise element; vise retaining means interconnecting said hinge element with said vise element for retaining said vise element in selectively adjusted tilted position; a cradle element below said hinge element including an adjustably tiltable cradle detachably connected to the lower one of said hinge leaves and a supporting base member for said cradle, said cradle being tiltable about a horizontal axis which is vertically plane-aligned with the longitudinal axis of said vise element; cradle securing means for securing said cradle element in selectively adjusted tilted position; a foundation base for the device; and a turntable rotatably supported on said foundation base, said turntable being rotatable about a vertical axis intersecting said horizontal axis of said cradle and being detachably connected to said cradle supporting base member; and means for securing said turntable in selected rotatably adjusted position; the vertical axis of said turntable being disposed between a vertical line passing through the pivotal axis of said vise element and the vertical center-line of said cradle element relatively longitudinally of said foundation base.

6. A tool or work-holding device comprising a vise element; a hinge element below said vise element comprising a pair of superposed pivotally connected leaves, the upper one of said leaves being connected to said vise element and the pivotal axis of said hinge element being disposed transversely to the longitudinal axis of said vise element; vise retaining means interconnecting said hinge element with said vise element for retaining said vise element in selectively adjusted tilted position; a cradle element below said hinge element including an adjustably tiltable cradle connected to the lower one of said hinge leaves and a supporting base member for said cradle, said cradle being tiltable about a horizontal axis which is vertically plane-aligned with the longitudinal axis of said vise element; cradle securing means for securing said cradle element in selectively adjusted tilted position; a foundation base for the device; and a turntable rotatably supported on said foundation base, said turntable being rotatable about a vertical axis intersecting said horizontal axis of said cradle and being connected to said cradle supporting base member; means for securing said turntable in selected rotatably adjusted position; said vise element and said hinge element being detachably connectable to said cradle element to permit use of said elements as a unit on a machine tool or work bench independently of the other members and parts of said device, and threaded connection means insertable into threaded openings in said lower leaf of said hinge element for connecting the combined vise and hinge unit to the machine tool or work bench, said threaded openings in said lower hinge leaf being normally engaged by threaded connection members which connect said lower hinge leaf with the cradle element in the completely assembled device.

7. A tool or work-holding device comprising a vise element; a hinge element below said vise element comprising a pair of superposed pivotally connected leaves, the upper one of said leaves being connected to said vise element and the pivotal axis of said hinge element being disposed transversely to the longitudinal axis of said vise element; vise retaining means interconnecting said hinge element with said vise element for retaining said vise element in selectively adjusted tilted position; a cradle element below said hinge element including an adjustably tiltable cradle connected to the lower one of said hinge leaves and a supporting base member for said cradle, said cradle being tiltable about a horizontal axis which is vertically plane-aligned with the longitudinal axis of said vise element; cradle securing means for securing said cradle element in selectively adjusted tilted position; a foundation base for the device; and a turntable rotatably supported on said foundation base, said turntable being rotatable about a vertical axis intersecting said horizontal axis of said cradle and being connected to said cradle supporting base member; means for securing said turntable in selected rotatably adjusted position; said vise, hinge and cradle elements and said cradle supporting base member being detachably connectable to said turntable to permit use of said elements together with said cradle supporting base member as a unit on a machine tool or work bench independently of said turntable and said foundation base, and threaded connection means insertable into threaded openings in said supporting base member for connecting the unit to the machine tool or work bench, said threaded openings in said supporting base member being normally engaged by threaded connection members which connect said supporting base member with said turntable in the completely assembled device.

8. A tool or work-holding device comprising a vise element; a hinge element below said vise element comprising a pair of superposed pivotally connected leaves, the upper one of said leaves being connected to said vise element and the pivotal axis of said hinge element being disposed transversely to the longitudinal axis of said vise element; vise retaining means interconnecting said hinge element with said vise element for retaining said vise element in selectively adjusted tilted position; a cradle element below said hinge element including an adjustably tiltable cradle connected to the lower one of said hinge leaves and a supporting base member for said cradle, said cradle being tiltable about a horizontal axis which is vertically plane-aligned with the longitudinal axis of said vise element; cradle securing means for securing said cradle element in selectively adjusted tilted position; a foundation base for the device; and a turntable rotatably supported on said foundation base, said turntable being rotatable about a vertical axis intersecting said horizontal axis of said cradle and being connected to said cradle supporting base member; means for securing said turntable in selected rotatably adjusted position; said vise element being detachably connectable to said hinge element and adapted for disconnection from said hinge element for mounting on and connection to said cradle element for use as a unit on a machine tool or work bench independently of the other elements and parts of the device, the threaded connection means which normally connect said cradle element with said hinge lower leaf in the completely assembled device being insertable into threaded openings in the base of said vise element for connecting the vise and cradle elements, and additional threaded connection means insertable into threaded openings in said supporting base member for connecting the unit to the machine tool or work bench, said threaded openings in said supporting base member being normally engaged by threaded connection members which connect said supporting base member with said turntable in the completely assembled device.

9. A tool or work-holding device comprising a vise element; a hinge element below said vice element comprising a pair of superposed pivotally connected leaves, the upper one of said leaves being connected to said vise element and the pivotal axis of said hinge element being disposed transversely to the longitudinal axis of said vise element; vise retaining means interconnecting said hinge element with said vise element for retaining said vise element in selectively adjusted tilted position; a cradle element below said hinge element including an adjustably tiltable cradle connected to the lower one of said hinge leaves and a supporting base member for said cradle, said cradle being tiltable about a horizontal axis which is vertically plane-aligned with the longitudinal axis of said vise element; cradle securing means for securing said cradle element in selectively adjusted tilted position; a foundation base for the device; and a turntable rotatably supported on said foundation base, said turntable being rotatable about a vertical axis intersecting said horizontal axis of said cradle and being connected to said cradle supporting base member; means for securing said turntable in selected rotatably adjusted position; said vise element being detachable connectable to said hinge element and adapted for disconnection from said hinge element for mounting on and connection to said turntable and its supporting foundation base for use as a unit on a machine tool or work bench independently of the other elements and parts of the device, the threaded connection means which normally connect the turntable with the cradle supporting base member in the completely assembled device being insertable into the threaded openings in the base of said vise element for connecting the vise element with the turntable and the foundation base therefor, and means for connecting the foundation base to the machine tool or work bench.

10. A tool or work-holding device comprising a vise element; a hinge element below said vise element comprising a pair of superposed pivotally connected leaves, the upper one of said leaves being connected to said vise element and the pivotal axis of said hinge element being disposed transversely to the longitudinal axis of said vise element; vise retaining means interconnecting said hinge element with said vise element for retaining said vise element in selectively adjusted tilted position; a cradle element below said hinge element including an adjustably tiltable cradle connected to the lower one of said hinge leaves and a supporting base member for said cradle, said cradle being tiltable about a horizontal axis which is vertically plane-aligned with the longitudinal axis of said vise element; cradle securing means for securing said cradle element in selectively adjusted tilted position; a foundation base for the device; and a turntable rotatably supported on said foundation base, said turntable being rotatable about a vertical axis intersecting said horizontal axis of said cradle and being connected to said cradle supporting base member; means for securing said turntable in selected rotatably adjusted position; said vise and hinge elements being detachable as a unit and adapted to be mounted on and connected to said turntable and its supporting foundation base for use as a unit on a machine tool or work bench independently of the other elements and parts of the device, the threaded connection means which normally connect the turntable with the cradle supporting base member in the completely assembled device being insertable into the threaded openings in the hinge lower leaf, and means for connecting the foundation base to the machine tool or work bench.

11. A tool or work-holding device comprising a vise element; a hinge element below said vise element comprising a pair of superposed pivotally connected leaves, the upper one of said leaves being connected to said vise element and the pivotal axis of said hinge element being disposed transversely to the longitudinal axis of said vise element; vise retaining means interconnecting said hinge element with said vise element for retaining said vise element in selectively adjusted tilted position; a cradle element below said hinge element including an adjustably tiltable cradle connected to the lower one of said hinge leaves and a supporting base member for said cradle, said cradle being tiltable about a horizontal axis which is vertically plane-aligned with the longitudinal axis of said vise element; cradle securing means for securing said cradle element in selectively adjusted tilted position; a foundation base for the device; and a turntable rotatably supported on said foundation base, said turntable being rotatable about a vertical axis intersecting said horizontal axis of said cradle and being connected to said cradle supporting base member; means for securing said turntable in selected rotatably adjusted position; said vise element being detachable from said hinge element and adapted for mounting on and connection to said cradle element whereby said vise element, cradle element, turntable and foundation base are adapted for use as a unit on a machine tool or work bench independently of said hinge element, the threaded connection means which normally connect said cradle element with said hinge element in the completely assembled device being insertable into threaded openings in the base of said vise element to thereby connect the vise and cradle elements, and means for connecting said foundation base to a machine tool or work bench.

12. A tool or work-holding device comprising a vise element; a hinge element below said vise element comprising a pair of superposed pivotally connected leaves, the upper one of said leaves being detachably connected to said vise element and the pivotal axis of said hinge element being disposed transversely to the longitudinal axis of said vise element; vise retaining means interconnecting said hinge element with said vise element for retaining said vise element in selectively adjusted tilted position; a cradle element below said hinge element including an adjustably tiltable cradle detachably connected to the lower one of said hinge leaves and a supporting base member for said cradle, said cradle being tiltable about a horizontal axis which is vertically plane-aligned with the longitudinal axis of said vise element; cradle securing means for securing said cradle element in selectively adjusted tilted position; a foundation base for the device; and a turntable rotatably supported on said foundation base, said turntable being rotatable about a vertical axis intersecting said horizontal axis of said cradle and being detachably connected to said cradle supporting base member; and means for securing said turntable in selected rotatably adjusted position; said elements being provided with means for securing said elements together in the completely assembled device, and said vise element being adapted to be detached for individual use or in selected combined use with one or more of said other elements without requiring additional securing means for securing said vise element in such selected combined use with one or more of said other elements other than the securing means provided for securing all of the elements in the completely assembled device.

ANTON J. GRUNTORAD.